United States Patent [19]

Smith

[11] Patent Number: 4,458,863

[45] Date of Patent: Jul. 10, 1984

[54] STRUT SUPPORTED INLET

[75] Inventor: Michael A. Smith, Tacoma, Wash.

[73] Assignee: The Boeing Company, Seattle, Wash.

[21] Appl. No.: 128,513

[22] Filed: Mar. 10, 1980

[51] Int. Cl.³ .............................................. B64D 27/00
[52] U.S. Cl. ................... 244/54; 244/53 B; 239/265.29
[58] Field of Search ............ 244/54, 53 R, 53 B; 248/554; 60/39.31, 39.32, 226 A, 226 R; 239/265.25, 265.27, 265.29, 265.31; 137/15.1, 15.2

[56] References Cited

U.S. PATENT DOCUMENTS

| 2,680,346 | 6/1954 | Michael . | |
|---|---|---|---|
| 2,978,209 | 4/1961 | Kerry | 244/54 |
| 3,750,983 | 8/1973 | Morris | 244/54 |
| 3,897,030 | 7/1975 | Cors et al. | 244/54 |
| 4,022,018 | 5/1977 | Tuten et al. | 244/54 |
| 4,205,813 | 6/1980 | Evans | 239/265.29 |

FOREIGN PATENT DOCUMENTS

| 1187491 | 2/1965 | Fed. Rep. of Germany | 239/265.29 |
|---|---|---|---|
| 967640 | 11/1950 | France . | |
| 1411601 | 10/1975 | United Kingdom | 244/54 |
| 2010969 | 7/1979 | United Kingdom | 244/54 |

Primary Examiner—Trygve M. Blix
Assistant Examiner—Stephen P. Avila
Attorney, Agent, or Firm—Christensen, O'Connor, Johnson & Kindness

[57] ABSTRACT

A high bypass turbofan engine is coupled to a wing strut by a spaceframe thrust linkage. The linkage transfers the axially oriented thrust-induced loads to the strut along the axial horizontal centerplane of the engine. The inlet to the engine is supported by a combined triangular and tetrahedral linkage system which suspends the inlet and transfers axial, vertical, and side loads directly from the inlet to the strut. The inlet is coupled to the engine fan case via a plurality of fluid-filled piston and cylinder assemblies that transmit only axially oriented loads from the inlet to the fan case. Additionally, the linear actuators for the annular thrust reverser are coupled to the inlet so that the axial thrust reversing loads are first transferred to the inlet, from which the axial loads are effectively transferred to the fan case along the engine centerline and hence to the strut via the spaceframe linkage.

25 Claims, 12 Drawing Figures

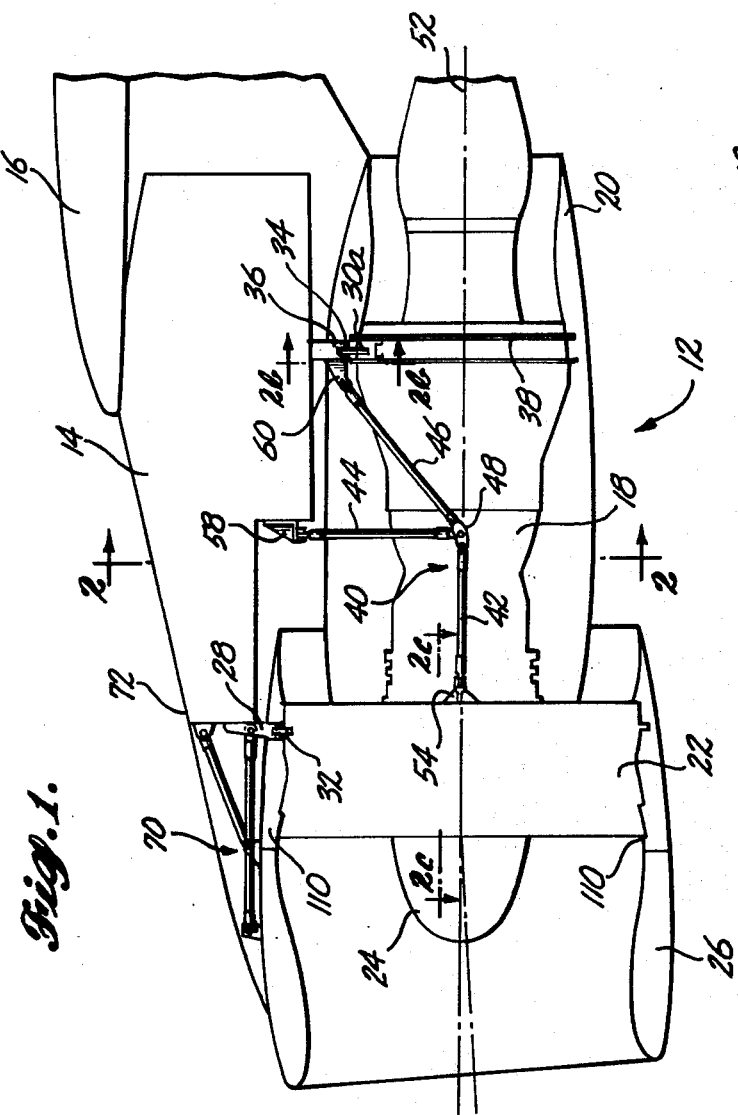
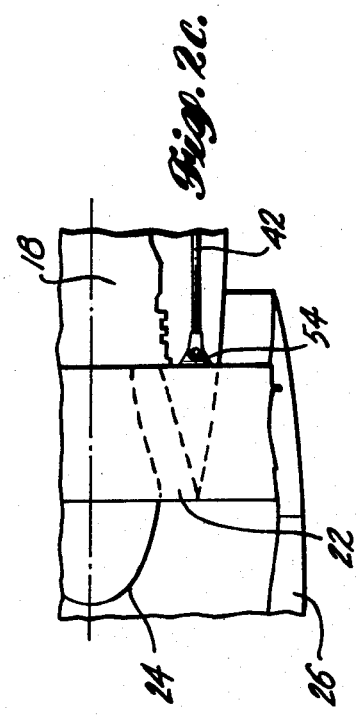
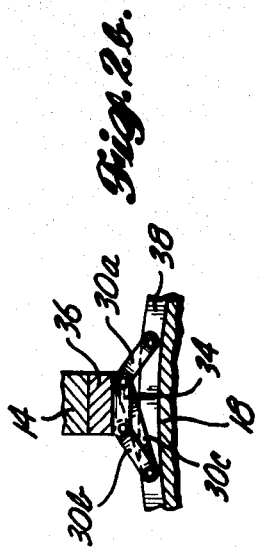
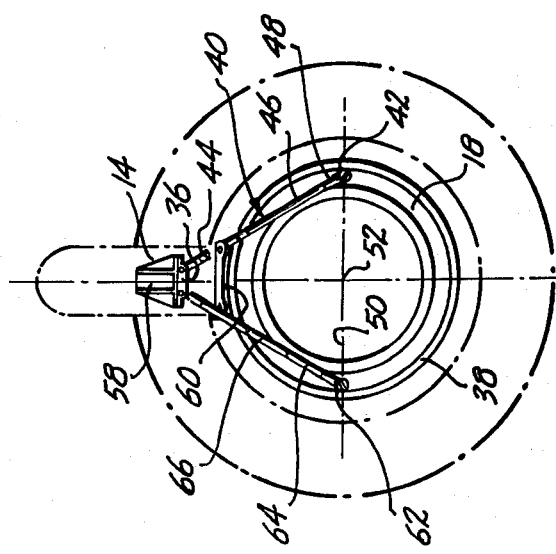

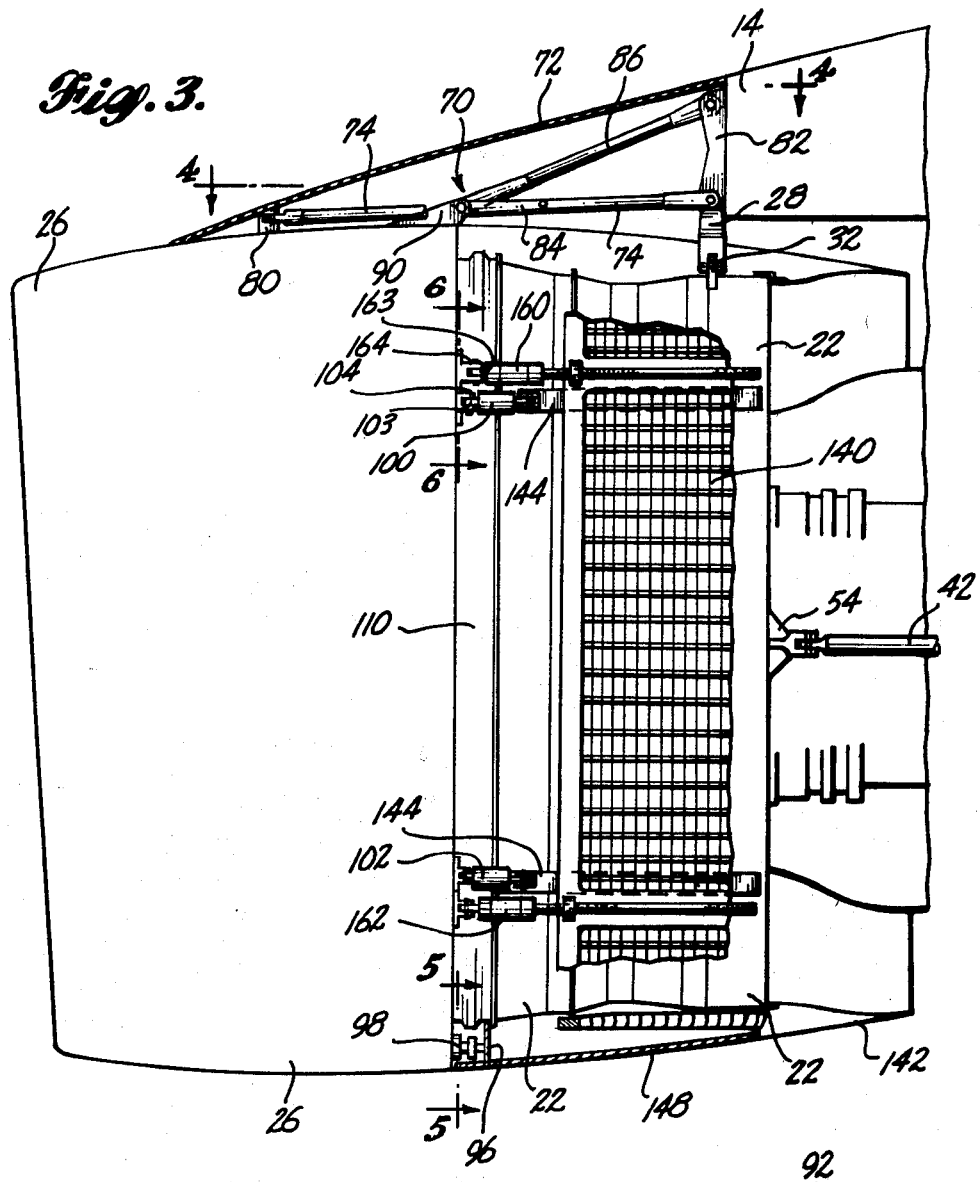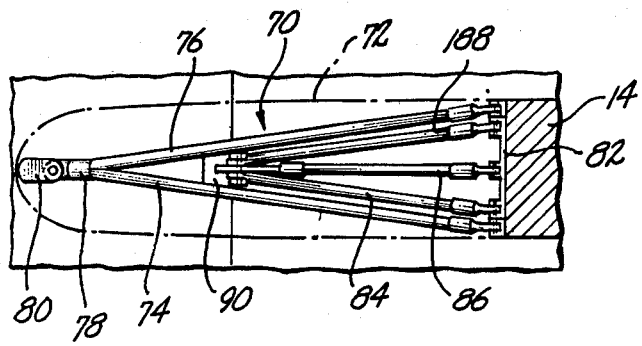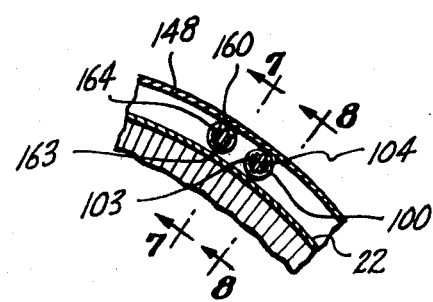

STRUT SUPPORTED INLET

BACKGROUND OF THE INVENTION

The present invention relates to engine mounting apparatus for turbofan jet propulsion engines, particularly to apparatus for mounting the turbofan jet propulsion engine on a wing strut extending downwardly from the wing, and most particularly to an apparatus for supporting the inlet from the jet propulsion engine, an apparatus for coupling the turbofan engine to a wing strut so as to transfer thrust loads along a centerplane of the engine, and to an assembly for transferring axial fan thrust reverser loads through the inlet and back to the engine so that they can be removed along an axial centerplane of the engine.

Turbofan jet propulsion engines are currently attached to wing struts and other airplane structure by a wide variety of different types of linkages, yokes, and mounts. These mounting structures are coupled to the engine at points other than the axial centerplane of the engine, and thus impose thrust-induced bending moments, vertical kick loads, and lateral pinch loads on the engine itself, and particularly on the fan case. When these forces become great enough, the fan case is distorted so that the blade tip seals and the fan blades rub on the interior of the case, a major cause of premature engine deterioration and excessive fuel burn.

Further, the inlet of a strut mounted turbofan engine is generally bolted directly to the fan case of the engine. Aerodynamic and inertial moments imposed on the inlet, as for example occur at rotation of an airplane during takeoff, are thus transferred directly to the engine fan case as a bending moment, again causing blade and tip seal wear and consequent engine deterioration and performance loss.

Additionally, the thrust reverser on a high bypass turbofan engine having a short fan duct and strut mounted nacelle is normally attached directly to the engine fan case. Aerodynamic and inertial loads imposed upon the thrust reverser are not uniformly axially oriented, thus again causing fan case distortion, fan blade and tip seal wear, and consequent engine deterioration and performance loss.

It is therefore an object of the present invention to provide structure for coupling a turbofan jet propulsion engine in an underslung position to a wing strut so that virtually no thrust-induced bending moments, kick loads, or pinch loads are exerted on the engine case, fan case, or other parts of the engine. It is a further object of the present invention to provide engine mounting structure for transferring thrust and other loads from the engine to a strut or other airplane structure on which the engine is mounted only in an axial direction. It is another object of the present invention to prevent bending moments caused by aerodynamic and inertial loads from being transferred from the inlet to the fan case and to provide additional structure for transferring nonaxial components of these loads directly from the inlet to the wing strut. It is a further object of the present invention to isolate the engine from bending moments produced by the fan thrust reverser on a high bypass turbofan engine. Conjunctively, it is yet a further object of the present invention to transfer a portion of such bending moments to the inlet and to transfer only axially oriented portions of a moment couple back to the engine fan case and thus to the strut through the engine mounting structure.

SUMMARY OF THE INVENTION

In accordance with the foregoing objects and other objects that will become apparent to one of ordinary skill, the present invention first provides a spaceframe linkage for coupling a turbofan engine to airplane structure, and particularly to a wing strut, so as to transfer thrust-induced loads only through an axial centerplane of the engine. The coupling apparatus comprises a first linkage means for coupling one side of the engine case to the wing strut or other airplane structure. A first forward connecting means interconnects the first linkage means to one side of the engine case at a location intersected by an engine centerplane. The first linkage means is so constructed and arranged to transmit loads from the forward to the rearward end of the linkage means along the centerplane. A first rearward connecting means connects the rearward end of the first linkage means to airplane structure. A second linkage means comprising the mirror image of the first linkage means couples the other side of the engine case to the wing strut. The second linkage means is also constructed and arranged to transmit loads from the forward end thereof to the rearward end thereof along the centerplane on the opposite side of the engine from the first linkage means.

In another aspect, the present invention provides an assembly for supporting the engine inlet from a strut extending downwardly from an airplane wing. The assembly comprises first and second linkage means. The forward end of the first linkage means is affixed to the upper portion of the inlet at a first inlet location. The first linkage means extends rearwardly from the first inlet location toward the strut. The rearward end of the first linkage means is affixed to the strut at a first strut location. The first linkage means is constructed and arranged to transmit side loads to the strut from the inlet. The forward end of the second linkage means is affixed to the inlet at a second inlet location. The second linkage means extends rearwardly from the second inlet location toward the strut and is affixed to the strut at a second strut location. The second linkage means is also constructed and arranged to transmit vertical, axial, and side loads to the strut from the inlet. The first and second inlet locations as well as the first and second strut locations are spaced from each other so that a rigid inlet support structure is formed by the combined linkage means.

In a third aspect of the present invention a load isolation assembly is provided to isolate the engine and associated structure from nonaxial components of bending moments normally produced by a fan thrust reversing mechanism mounted on the fan case of the engine. The assembly includes first, second, and third linkage means. The first linkage means affixes the inlet to airplane structure, and particularly to a strut. The first linkage means is capable of transmitting vertical, axial, and side loads imposed on the inlet to the strut. The second linkage means couples the engine to airplane structure so as to transmit only axially oriented loads from the engine to the airplane structure. The third linkage means couples the inlet to the fan case of the engine so as to transmit only axial loads from the inlet to the fan case. The thrust reverser is mounted for movement between a stowed position and an operative position wherein fan air is diverted outwardly and forwardly relative to the engine. An actuating means for moving the thrust reverser between the stowed and operative positions couples the thrust reverser to the inlet and functions to transmit certain loads that would otherwise exert bending moments on the fan case from the reverser directly to the inlet. The third linkage means then transmits axially oriented loads back to the fan case, from whence they are relayed to the engine strut via the second linkage means. The nonaxial components of the bending moments are transferred directly to the strut by the first linkage means.

BRIEF DESCRIPTION OF THE DRAWINGS

A better understanding of the present invention can be derived by reading the ensuing specification in conjunction with the accompanying drawings wherein:

FIG. 1 is a side elevation view in partial longitudinal section of a turbofan engine, wing mounting strut, the spaceframe engine mounting linkage of the present invention and the inlet support linkage of the present invention;

FIG. 2a is a cross-sectional view of the turbofan engine and spaceframe mounting linkage taken along section line 2a—2a of FIG. 1;

FIG. 2b is a cross-sectional view of the aft engine hanger taken along section line 2b—2b of FIG. 1;

FIG. 2c is a segment of the engine in partial longitudinal section showing a portion of the spaceframe mounting linkage taken along a section line similar to 2c—2c of FIG. 1;

FIG. 3 is an enlarged elevation view of the forward portion of the engine with portions broken away showing the inlet support linkage, the inlet, the fan case and a portion of the fan reversing mechanism;

FIG. 4 is a plan view of the inlet support linkage and strut with the strut fairing omitted taken along view line 4—4 of FIG. 3;

FIG. 5 is a cross-sectional view of a segment of the lower portion of the inlet and fan case taken along section line 5—5 of FIG. 3 showing the sway bar that couples the inlet to the fan case;

FIG. 6 is a cross-sectional view of a portion of the fan case, the reverser actuating mechanism, and the reverser/inlet coupling taken along section line 6—6 of FIG. 3;

DETAILED DESCRIPTION OF THE INVENTION

Figure 7:
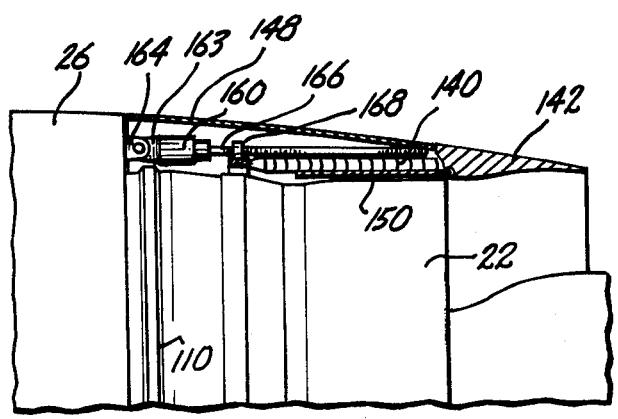
FIG. 7 is a sectional view of the engine taken along section line 7—7 of FIG. 6 showing the reverser actuating mechanism in its stowed position.

Referring first to FIGS. 1 and 2a and 2b, a turbofan jet propulsion engine, generally designated 12, is slung under a wing strut 14, the upper end of which is fastened to an airplane wing 16. The turbofan engine 12 is of the high bypass type currently used on commercial airliners. The engine includes a core assembly housed in a core case 18, a primary nozzle assembly 20, a fan case 22 housing the bypass fan, an inlet cone 24, and an inlet 26. (The fan thrust reverser and associated mechanism are omitted from FIG. 1 for purposes of clarity, but will be discussed in more detail in conjunction with later figures.) The engine is suspended from the strut 14 by a forward suspension link 28 and aft suspension links 30a, 30b, and 30c. The upper end of the forward suspension link 28 is affixed to the forward end of the strut 14 while the bottom portion of the suspension link 28 is pinned to a flange 32 extending upwardly from the top of the fan case 22. The upper ends of the aft suspension links 30a and 30b are pinned at spaced locations to a downwardly extending flange 34 in turn integrally affixed to a mounting block 36 depending from and forming part of the strut 14. Links 30a and 30b diverge from each other as they extend downwardly from the flange 34. The lower ends of the links 30a and 30b are pinned to parallel, annular flanges 38 on the aft end of the engine core case 18. The third suspension link 30c extends between the upper mounting location of link 30a and the engine mounting location of link 30b. The suspension links 30a, b, and c thus transfer vertical, side and torque loads from the engine core case 18 to the strut 14.

The suspension links 28 and 30a, 30b and 30c are not designed to transmit axial loads from the engine to the strut. Rather, axial loads are transferred through the strut by the spaceframe linkage, generally designated 40. Referring to FIGS. 1, 2a, and 2c, the right half of the spaceframe linkage 40 (looking rearwardly from the front of the engine) includes three links 42, 44, and 46 and link coupler 48. Horizontal link 42 is intersected by the horizontal engine plane 50 that intersects the axis 52 of the engine. The horizontal engine plane 50 is indicated by the horizontal dot-dash line in FIG. 2a and by the horizontal engine axis line in FIG. 1. A connecting flange 54 is affixed to and extends rearwardly from the portion of the engine structure that interconnects the core 18 with the fan. The connecting flange 54 is located at the aft face of the fan and is rigidly affixed to the engine case structure. The forward end of the horizontal link 42 is pinned by a suitable, conventional fastener to the connecting flange 54. The rearward end of the horizontal link 42 is pinned to L-shaped, link coupler 48. The lower end of links 44 and 46 are also pinned to the L-shaped coupler 48 and extend divergently relative to each other upwardly and inwardly from the coupler 48. The upper end of link 44 is pinned to a connecting flange 58 in turn affixed to the strut 14 above the midportion of the engine 12. Link 46 extends rearwardly from the L-shaped coupler 48 and is affixed to a coupling flange 60 in turn affixed to the mounting block 36. The coupling flange 60 is located immediately in front of the suspension links 30a and 30b above the core case 18.

The left half of the spaceframe linkage 40 is essentially the mirror image of the right half of the spaceframe linkage 40. Referring to FIG. 2a, the left half of the spaceframe linkage includes a rearwardly extending connecting flange (not shown) similar to connecting flange 54, horizontal link 62, an L-shaped coupler (which also cannot be seen in FIG. 2a) similar to coupler 48, a forward support link 64 corresponding to link 44, and a rearward link 66 corresponding to link 46. The horizontal links 42 and 62 are spaced equidistantly from the engine axis 52 and connected to engine structure equidistantly from the axis so that both sides of the linkage are equally loaded. Links 44 and 64 both lie in the plane that is orthogonal to the engine axis 52. Links 44 and 64 converge upon each other as they extend upwardly and are connected at spaced locations to the same connecting flange 58. Similarly, the links 66 and 46 converge toward each other as they extend upwardly and are connected at spaced locations to the same coupling flange 60. By interconnecting the engine 12 to the strut 14 via the spaceframe linkage, all thrust-induced loads generated by the engine are removed from the engine along the horizontal engine plane 50 and transmitted via links 42 and 62 to the remaining links of the spaceframe linkage 40. The forwardly directed axial loads from links 42 and 62 are then divided into components lying along the links 44, 46, 64, and 66, placing links 44 and 64 in compression and links 46 and 66 in tension. It is, of course, to be understood that the upper ends of links 44 and 64 and 66 must be axially spaced from each other at their connection points to the strut 14, but need not be connected to the strut at the locations just discussed. For example, the upper links 44 and 64 could extend forwardly from the connecting links and be affixed to the strut adjacent its forward end; however, this latter positioning of the upper ends of the links 44 and 64 is undesirable as they must then intersect the aft end of the fan nozzle. Thus, when the spaceframe linkage of the present invention is employed to transfer loads from the engine 12 to the strut 14, twisting or bending moments are not exerted on the engine core or the fan case. As a consequence, the fan case is not distorted and the associated problems of fan blade and tip seal wear are virtually eliminated.

Referring to FIGS. 1, 3, and 4, the inlet 26 is cantilevered from the forward end of the strut 14 by support linkage generally designated 70. The support linkage 70 is covered by a strut fairing 72 that extends from the forward end of the strut to a location adjacent the forward end of the inlet 26. The strut fairing 72 is shown only in ghost outline in FIG. 4. Referring specifically to FIGS. 3 and 4, the support linkage 70 includes two sets of links. The first set of links includes links 74 and 76, the forward ends of which are joined by a coupler 78. The coupler 78 is connected to a bracket 80 affixed to and extending upwardly from the upper, central portion of the inlet 26. The links 74 and 76 diverge rearwardly and substantially horizontally toward the strut 14 where they are affixed to a forwardly extending flange 82 mounted on the forward end of the strut 14. The rear ends of the links 74 and 76 are pinned at spaced locations adjacent opposite sides of the fairing 72. The first set of links is intended to transfer side loads from the inlet to the strut 14.

The other set of links 84, 86, and 88 form a tetrahedral linkage. The lower forward ends of links 84, 86, and 88 are pinned to a bracket 90 affixed to and extending upwardly from the upper, rearward portion of the inlet 26, at a location aft of bracket 80. Two of the three links, 84 and 88, extend horizontally rearwardly from the bracket 90 in a divergent fashion and are pinned to the lower end of forwardly extending flange 82 at a location adjacent the fastening locations of links 74 and 76. The central link 86 extends upwardly and rearwardly from the mounting bracket 90 and is affixed to the rearwardly extending flange 82 at a central location above the aft connection points of the remaining links 84 and 88. The tetrahedral link system thus formed by links 84, 86, and 88 joins one point of the inlet to the strut and transfers vertical, axial, and side loads from the inlet to the strut 14. The triangular linkage system formed by links 74 and 76 supports a second point on the inlet spaced forwardly from the point at which the tetrahedral link system is attached and primarily carries side loads from the inlet to the strut. The two linkage systems in combination thus support any yaw moment imposed on the inlet with a coupled force system.

Referring to FIGS. 3 and 5, the bottom end of the inlet 26 is coupled to the fan case 22 via a sway bar or link 92. The sway bar 92 is coupled to a flange 96 extending radially downwardly from the forward, lower end of the fan case 22. One end of the sway bar 92 is pinned to the flange 96. The sway bar 92 extends essentially in a tangential direction relative to the fan case away from the flange 96. The other end of the sway bar 92 is pinned to a bracket 98 extending rearwardly from the lower bottom portion of the inlet 26. The sway bar 92 thus couples side loads on the bottom of the inlet to the fan case, the only nonaxial load that is transmitted directly to the fan case from the inlet as will be seen more clearly after reading the ensuing portion of the specification.

The inlet is also coupled to the fan case 22 by four piston and cylinder assemblies, two of which, 100 and 102, are visible in FIG. 3. The other two piston and cylinder assemblies 112 and 114 are shown schematically in FIG. 10, but in actuality are located on the opposite side of the engine from 100 and 102. All four of the assemblies are essentially equidistantly spaced about the circumference of the inlet and the fan case. Referring to FIG. 3 conjunctively with FIGS. 6 and 8, the cylinder of the piston and cylinder assembly 100 carries a forwardly extending flange 103 that is pinned to a second flange 104 affixed to and extending rearwardly from the inlet 26. The piston arm 106 extends rearwardly from the cylinder and has its rearward end pinned to a second flange 108 affixed to and extending radially outwardly from the fan case 22. The four piston and cylinder assemblies are similarly coupled between the inlet and the fan case and maintain the fan case inlet 26 at a location spaced forwardly of the fan case. The inner wall (not shown) of the inlet and the fan case are joined by a flexible duct seal 110.

Figure 10:
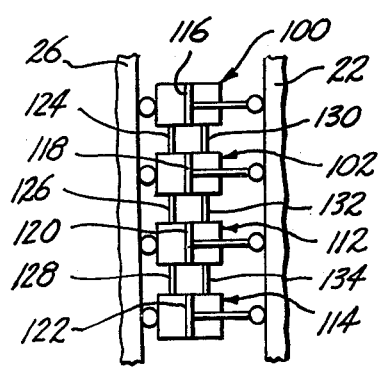
FIG. 10 is a schematic view of the fluid filled coupling members that interconnect the fan casing and the inlet in accordance with the present invention.

Referring to FIG. 10, the cylinders of each of the piston and cylinder assemblies 100, 102, 112, and 114, as shown in the schematic diagram of FIG. 10 are divided into two substantially equal chambers by the respective pistons 116, 118, 120, and 122. The forward chambers are interconnected by fluid lines 124, 126, and 128, thus placing all of the forward fluid chambers in fluid communication with each other. Similarly, the aft chambers of the cylinders are interconnected by fluid lines 130, 132, and 134 to place each of the aft chambers in fluid communication with each other. The cylinders are filled with a fluid, preferably an incompressible fluid, although under some circumstances, a pressurized compressible fluid is satisfactory. The four piston and cylinder assemblies are capable conjunctively of transmitting axial loads from the inlet to the fan case. However, if a bending moment that is generally acting in a vertical plane (pitch moment) is applied to the inlet, for example as can occur during rotation on takeoff of an aircraft, the inlet will tend to angulate slightly about a horizontal transverse axis relative to the fan case. If the inlet were rigidly attached to the fan case, the bending moment would be transmitted to the fan case. However, with the piston and cylinder assembly of the present invention is employed, a flexible coupling is provided, which transmits only axial loads to the fan case. The remaining components of the pitch moment are transferred directly to the strut 14 via the tetrahedral linkage comprising links 84, 86, and 88. Side or vertical loads, of course, are transmitted directly to the strut 14 from the inlet via the strut support linkage 70 discussed above.

As discussed above, the fan thrust reversing loads of prior art turbofan engines are applied directly to the fan case from the fan thrust reverser. In accordance with the present invention, however, the axially oriented components of these loads are transferred first to the inlet, from which axial loads are then transferred to the fan case via the piston and cylinder assemblies. Referring to FIGS. 3, 6, and 7, the thrust reverser is of conventional design and includes an annularly shaped set of cascades 140. The cascades when not in operation are positioned so that they surround the fan case 22. It will be noted in FIG. 3 that portions of the cascades 140 have been cut away for clarity to show the underlying fan case. The aft portion of cascades terminates adjacent the aft face of the fan case and adjacent the forward end of the outer portion 142 of the fan nozzle. The annular cascades 140 are discontinuous at their uppermost portion so that they clear the upwardly extending engine suspension flange 32.

Figure 8:
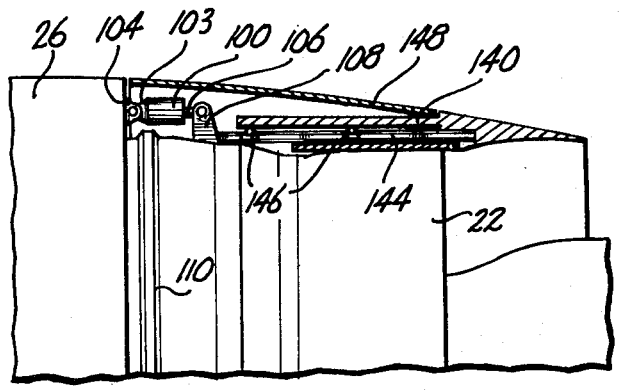
FIG. 8 is a sectional view of the engine taken along the section line 8—8 of FIG. 6 showing the fluid filled coupling that connects the fan case to the inlet.
Figure 9:
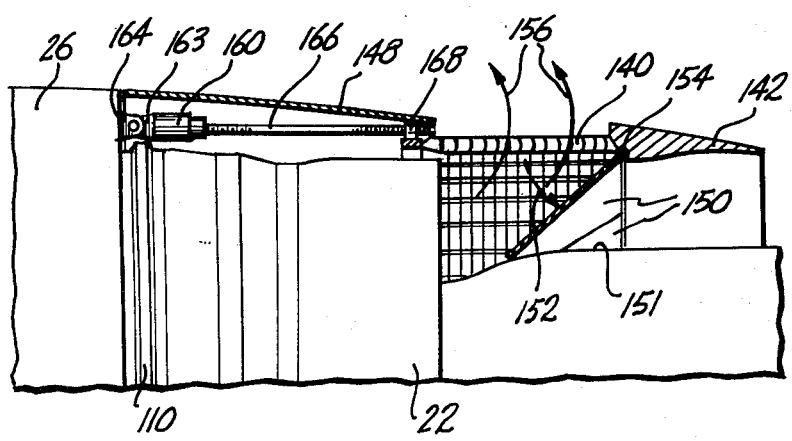
FIG. 9 is a sectional view similar to that taken along section line 7—7 showing the reverser in its operative reversing position.

Referring specifically to FIGS. 3 and 8, the cascades 140 are mounted for fore and aft movement on a plurality of tracks 144 that are affixed to the fan case 22 and extend in fore and aft directions parallel to the axis of the engine. The tracks 144 are positioned adjacent the outer periphery of the fan case and radially inwardly from the cascades 140. As can be seen in FIG. 8, followers 146 affixed to the inner side of the cascades 140 ride in the tracks 144, thus mounting the cascades 140 for fore and aft translatory movement from the stowed position shown in FIGS. 3, 7, and 8, rearwardly to an operative position as can be seen in FIG. 9. At least four tracks 144 are employed to mount the cascades 140 for fore and aft translatory movement. The tracks are preferably equidistantly spaced around the circumference of the fan case 22 adjacent each of the piston and cylinder assemblies.

The cascades 140 and the outer portion 142 of the fan nozzle form an integral unit, thus the outer portion 142 of the fan nozzle moves rearwardly as the cascade is translated rearwardly along tracks 144. In the stowed position, as viewed in FIGS. 7 and 8, the inner, forward edge of the outer portion 142 of the fan nozzle abuts the aft end of the fan case 22, while the cascades are stowed between the outer surface of the fan case 22 and the fan cowl 148. In the operative or reversing position as shown in FIG. 9, the outer portion 142 of the fan nozzle as well as the cascades 140 are moved rearwardly. At the same time a plurality of diverter doors 150, which in the stowed position are located immediately inside the cascades 140, are swung inwardly in the direction of arrow 152 about respective hinges 154. The inner, forward edge of the diverter doors abuts the inner wall 151 of the fan nozzle so that the fan exhaust is diverted by the diverter doors 150 upwardly and outwardly through the cascades 140, which in turn direct the fan exhaust outwardly and forwardly in the direction of arrows 156 to provide reverse thrust. Actuating mechanism for the doors 150 is not shown for purposes of simplicity since the actuating mechanism is of conventional construction and function.

As one of ordinary skill will realize, reversing loads are exerted on the thrust reverser including the cascades 140. In prior art engines, these loads are directly transmitted to the fan case 22 via prior art actuating mechanisms and cascade tracks. However, in accordance with the present invention, the linear actuators for the thrust reverser are coupled between the reverser and the inlet as shown in FIGS. 3, 7, and 9. In the illustrated embodiment, four conventional jack-screw type actuators are employed to translate the thrust reverser between its operative and stowed positions. The jack-screw actuators are mounted substantially equidistantly from each other about the circumference of the fan case 22. Only two of the jack-screw actuators 160 and 162 can be seen in FIG. 3. The remaining two actuators are mounted on the opposite side of the engine from that shown in FIG. 3 and thus are not shown. However, the mounting mechanism and operation of each of the actuators is the same as jack-screw actuator 160, which will be described in detail in conjunction with FIGS. 7 and 9.

Jack-screw actuator 160 carries a forwardly extending flange 163 that is pinned to a rearwardly extending flange 164 that extends rearwardly from and is affixed to the rearward edge of the inlet 26. The screw 166 extends rearwardly from the body of the actuator 160 through a threaded block 168 affixed to the forward outer periphery of the support frame for the cascades 140. As the screw 166 is rotated simultaneously with the screws of the other jack-screw actuators, the cascades 140 are reciprocated between the stowed position (FIG. 7) and the operative position (FIG. 9). Since the cascade and associated structure ride freely in the tracks 144 mounted on the fan case, all reversing forces are transmitted through the screw 166, flanges 163 and 164, to the inlet 26. The axially oriented component of the reversing load thus transferred to the inlet are transmitted to the fan case via the piston and cylinder assemblies 100, 102, 112, and 114. The axial forces thus applied to the fan case are then removed via the spaceframe linkage 40 which transfers all thrust and axial reversing loads to the wing strut 14.

Each of the major aspects of the present invention, including the spaceframe linkage 40, the inlet support linkage 70, and thrust reverser mounting and actuating apparatus serve to reduce the magnitude of or eliminate bending moments and side and transverse loads that would otherwise normally be applied to the fan case 22 with conventional mounting structure, while allowing axial loads to be transmitted to and through the fan case 22. To summarize, horizontal loads applied to the inlet, including axially oriented fan thrust reverser loads, are applied to the fan case in the axial direction through the piston and cylinder assemblies and removed from the fan case via the spaceframe linkage. Vertical loads imposed on the inlet are transferred directly to the strut via the tetrahedral linkage while side loads are transferred to the strut via both the triangular linkage and the tetrahedral linkage. A portion of the side loads are also transferred to the fan case via the sway bar. Yaw moments (those moments acting in a horizontal plane) are transferred from the inlet to the strut via the coupled force system including the triangular and tetrahedral linkages. Pitch moments are transferred by a coupled force system to the strut via the tetrahedral linkage and to the fan case via the piston and cylinder assemblies. Roll moments induced in the inlet are removed via the tetrahedral linkage as well as the sway bar. By transferring forces to the strut in this manner, fan case distortions are substantially reduced, increasing engine efficiency and reducing blade and tip seal wear.

The present invention has been described in relation to a preferred embodiment. One of ordinary skill will understand that various alterations, substitutions of equivalents, and other changes can be made without departing from the broad concepts disclosed herein. For example, a uniflange assembly employing two flexible, toroidally shaped members to join an inlet to a fan case as disclosed in copending U.S. patent application Smith et al. (attorney docket number BCAC 1 0174) can be substituted for the piston and cylinder assemblies disclosed herein. This substitution can be made without altering the general nature of the invention disclosed or departing from the broad concepts disclosed in conjunction with the present invention. It is therefore intended that the protection granted by Letters Patent hereon be limited only by the definition contained in the appended claims and equivalents thereof.

The embodiments of the invention in which our exclusive property or privilege is being claimed are defined as follows:

1. Apparatus for coupling a turbofan engine to airplane structure, said turbofan engine having a fan case with a rear face and having an engine case attached to and extending rearwardly from said fan case, said engine having a longitudinally extending centerline and a centerplane extending through said centerline, said apparatus comprising:

first linkage means for coupling one side of said engine to said airplane structure, said first linkage means having a forward end and a rearward end that are spaced from each other and lie in said centerplane, first forward connecting means for interconnecting the forward end of said first linkage means to one side of said engine at a location intersected by said centerplane and adjacent the rear face of said fan case, said first linkage means being so constructed and arranged to transmit loads from the forward end to the rearward end of said linkage means along said centerplane, first rearward connecting means affixed to the rearward end of said first linkage means for connecting said rearward end to said airplane structure to transmit said loads to said airplane structure, and second linkage means for coupling the other side of said engine to said airplane structure, said second linkage means having a forward end and a rearward end that are spaced from each other and lie in said centerplane, second forward connecting means for interconnecting the forward end of said second linkage means to said other side of said engine at a location intersected by said centerplane, and adjacent the rear face of said fan case, said second linkage means being so constructed and arranged to transmit loads from the forward end to the rearward end of said second linkage means along said centerplane, second rearward connecting means affixed to the rearward end of said second linkage means for connecting said rearward end to said airplane structure to transmit said loads to said airplane structure.

2. The apparatus of claim 1 wherein said centerplane is substantially horizontally oriented.

3. The apparatus of claim 2 wherein the locations that said first and second linkage means are affixed to said engine are equidistantly spaced from said centerline.

4. The apparatus of claim 3 wherein said first linkage means comprises a first link oriented substantially parallel to said centerline and being intersected by said centerplane, said first link extending rearwardly from adjacent the rear face of said fan case, and said second linkage means comprising a second link oriented substantially parallel to said centerline and being intersected by said centerplane, said second link extending rearwardly from adjacent the rear face of said fan case.

5. The apparatus of claims 3 or 4 wherein said airplane structure is positioned above said engine, wherein said first rearward connecting means comprising a first pair of links having lower ends and upper ends, said lower ends of said first pair of links being connected to the rearward end of said first linkage means at a location lying substantially in said centerplane, said first pair of links extending upwardly from said centerplane toward said airplane structure and diverging from each other, the upper ends of said first pair of links being affixed to said airplane structure at locations spaced from each other, and wherein said second rearward connecting means comprising a second pair of links having lower ends and upper ends, said lower ends of said second pair of links being connected to the rearward end of said second linkage means at a location substantially lying in said centerplane, said second pair of links extending upwardly from said centerplane toward said airplane structure and diverging from each other, the upper ends of said second pair of links being affixed to said airplane structure at locations spaced from each other.

6. The apparatus of claim 5 wherein said airplane structure is positioned at a location lying substantially equidistantly from said locations where said first linkage means and said second linkage means are affixed to said engine.

7. The apparatus of claim 6 wherein said airplane structure comprises a wing strut extending downwardly from an airplane wing, said first and second pairs of links converging toward each other, the forward links of the two pairs of links being affixed to said strut at adjacent locations and the rearward links of the two pairs of links being affixed adjacent each other.

8. The apparatus of claim 7 wherein the forward links of the two pairs of links lie in a plane oriented substantially perpendicularly to said centerplane.

9. The apparatus of claim 8 wherein the rearward links of said two pairs of links extend upwardly and rearwardly from the respective locations wherein said rearward links are coupled respectively to said first linkage means and said second linkage means.

10. The apparatus of claim 9 wherein the rearward links of the two pairs of links are affixed to said strut at a location positioned below and rearwardly from the location at which said forward links of the two pairs of links are affixed to said strut.

11. An assembly for supporting an inlet for a jet propulsion engine from a strut extending downwardly from an airplane wing, said inlet being located forwardly from said strut, the assembly comprising:

first linkage means having forward and rearward ends, the forward end of said first linkage means being affixed to the upper portion of said inlet at a first inlet location, said first linkage means extending rearwardly from said first inlet location toward said strut, the rearward end of said linkage means being affixed to said strut at a first strut location, said first linkage means being constructed and arranged to transmit side loads to said strut from said inlet, and second linkage means having forward and rearward ends, the forward end of said second linkage means being affixed to the upper portion of said inlet at a second inlet location, said second linkage means extending rearwardly from said second inlet location toward said strut, the rearward end of said second linkage means being affixed to said strut at a second strut location, said first strut location being located at least partially below said second strut location, said second linkage means being constructed and arranged to transmit vertical, axial, and side loads to said strut from said inlet, said first and second inlet locations being longitudinally spaced from each other.

12. The assembly of claim 11 wherein said first inlet location is located at least partially forwardly of said second inlet location.

13. The assembly of claim 12 wherein said second linkage means comprises a pair of links coupled to said first inlet location to said inlet, said pair of links diverging rearwardly toward said first strut location, said pair of links and said strut forming a triangularly shaped linkage to transmit side loads from said inlet to said strut.

14. The assembly of claim 13 wherein said second linkage means comprises a tetrahedral linkage having a forwardly positioned first arm joined to three rearwardly divergent arms, said first arm being affixed to said inlet at said second inlet location, the central one of said arms extending upwardly and rearwardly from said first arm and being affixed to said strut, the other two of said three arms being affixed to said first arm and diverging rearwardly from said first arm and the central one of said three arms, said other two arms being affixed to said strut at positions spaced laterally from each other and below the location at which said central one of said arms is affixed to said strut, said tetrahedral linkage and said strut thereby forming a framework to support said inlet and transmit side, axial and vertical loads from said inlet to said strut.

15. The assembly of claim 14 wherein said jet propulsion engine has a fan case, the lower end of said portion of said inlet being coupled to said fan case by a sway bar oriented in a tangential direction relative to said fan case, one end of said sway bar being coupled to said fan case, the other end of said sway bar being coupled to said inlet, said linkage being so constructed and arranged and affixed to said inlet and to said fan case as to transmit side loads from said inlet to said fan case and to allow relatively uninhibited motion in the fore and aft direction between said inlet and said fan casing.

16. The assembly of claim 11 wherein said engine is a turbofan engine having a fan case, said assembly further comprising
third linkage means for coupling said inlet to said fan case so as to effectively transmit axial loads from said inlet to said fan case along the engine centerline.

17. The assembly of claim 16 wherein said inlet has a rearward face, and wherein said third linkage means comprises a plurality of hydraulic piston and cylinder assemblies spaced circumferentially about said fan case adjacent the rearward face of said inlet, the cylinder of each of said assemblies being affixed to one of the inlet and case, the piston of each of said assemblies being affixed to the other of said inlet and said case, each of said piston and cylinder assemblies being oriented for relative movement in a direction generally parallel to the axis of said engine, each of said assemblies having fore and aft chambers separated by the piston, means placing the forward chambers of each of the pistons in fluid communication with each other, and means placing the aft chambers of each of the cylinders in fluid communication with each other, said chambers being filled with a fluid.

18. The assembly of claim 17 wherein said fluid is a compressed gas.

19. The assembly of claim 17 wherein said fluid is a liquid.

20. An assembly for isolating a high bypass turbofan engine from nonaxial components of bending moments normally produced by a fan thrust reverser, said engine having an inlet, fan case and engine case, said thrust reverser being mounted on said fan case for movement between a stowed position and an operative position wherein said thrust reverser diverts fan air outwardly and forwardly relative to said engine, said assembly comprising
first linkage means for affixing said inlet to airplane structure, said first linkage means being capable of transmitting vertical, axial, and side loads imposed thereon to said airplane structure,
second linkage means for coupling said engine to said airplane structure so as to transmit only axially oriented loads from said engine to said airplane structure,
third linkage means for coupling said inlet to said fan case so as to transmit only axially oriented loads from said inlet to said fan case, and
actuating means for moving said thrust reverser between said stowed and operative positions, said actuating means fixed directly to said inlet so as to couple said thrust reverser mechanism to said inlet said actuating means thereby functioning to transmit axially oriented loads imposed on said thrust reverser to said inlet.

21. The assembly of claim 20 wherein said third linkage means comprises a plurality of hydraulic piston and cylinder assemblies spaced circumferentially about said fan case adjacent the rearward face of said inlet, the cylinder of each of said assemblies being affixed to one of the inlet and fan case, the piston of each of said assemblies being affixed to the other of said inlet and said fan case, each of said piston and cylinder assemblies being oriented for relative movement in a direction generally parallel to the axis of said engine, each of said assemblies having fore and aft chambers separated by the piston, means placing the forward chambers of each of the pistons in fluid communication with each other and means placing the aft chambers of each of the cylinders in fluid communication with each other, said chambers being filled with a fluid.

22. The assembly of claim 21 wherein said fluid is a compressed gas.

23. The assembly of claim 21 wherein said fluid is a liquid.

24. The assembly of claim 21 wherein said thrust reverser is annularly shaped and surrounds said fan case, said thrust reverser being mounted on said fan case for fore and aft sliding movement between said stowed and said operative positions, said actuating means comprising a plurality of jack-screw mechanisms coupled between said inlet and said thrust reverser.

25. The assembly of claim 24 wherein said airplane structure comprises a strut extending downwardly from an airplane wing.

* * * * *